United States Patent [19]
Rapp

[11] Patent Number: 4,831,704
[45] Date of Patent: May 23, 1989

[54] APPARATUS FOR CONNECTING THIN PLATES

[76] Inventor: Eugen Rapp, Max-Reger-Str. 4, 7981 Berg, Fed. Rep. of Germany

[21] Appl. No.: 181,998

[22] Filed: Apr. 15, 1988

Related U.S. Application Data

[62] Division of Ser. No. 906,871, Sep. 15, 1986, Pat. No. 4,760,634.

[30] Foreign Application Priority Data

Sep. 14, 1985 [DE] Fed. Rep. of Germany ....... 3532900
Apr. 19, 1986 [DE] Fed. Rep. of Germany ....... 3613324

[51] Int. Cl.$^4$ .............................................. B23P 19/04
[52] U.S. Cl. ................................ 29/243.52; 29/283.5; 29/243.53
[58] Field of Search ............... 29/243.5, 243.52, 283.5, 29/798, 21.1, 509, 522.1, 524.1, 243.53

[56] References Cited

U.S. PATENT DOCUMENTS

| | | | |
|---|---|---|---|
| 2,992,857 | 7/1961 | Lemmerz | 29/523 UX |
| 3,198,155 | 8/1965 | Fraze | 29/509 X |
| 3,359,935 | 12/1967 | Rosbottom | 29/524.1 X |
| 3,579,809 | 5/1971 | Wolf | 29/509 |
| 3,771,216 | 11/1973 | Johnson | 29/243.53 X |
| 3,993,428 | 11/1976 | Gumm et al. | 29/509 X |
| 4,459,735 | 7/1984 | Sawdon | 29/243.53 X |
| 4,614,017 | 9/1986 | Eckold et al. | 29/243.53 X |
| 4,757,609 | 7/1988 | Sawdon | 29/243.52 X |

Primary Examiner—Charlie T. Moon
Attorney, Agent, or Firm—Edwin E. Greigg

[57] ABSTRACT

An apparatus for connecting stacked thin plates 4, 5 (in particular sheet-metal plates) or plate sections, according to which stacked flat parts 10, 11 of both plates are first deep drawn together with one another, after which the bottom area of the deep-drawn flat parts is swaged wider, and wherein the radial expansion of the bottom area of these deep-drawn flat parts is limited, as a result of which a plastic deformation of the material of the plate takes place, particularly in the peripheral area, so that a connection point is created. By means of a crimp 17 present in the peripheral area of the bottom 16 of the blind opening 3 of the die 2, the swaged material flows into itself at the points that are to be connected, and hence the clinching strength, is improved.

15 Claims, 1 Drawing Sheet

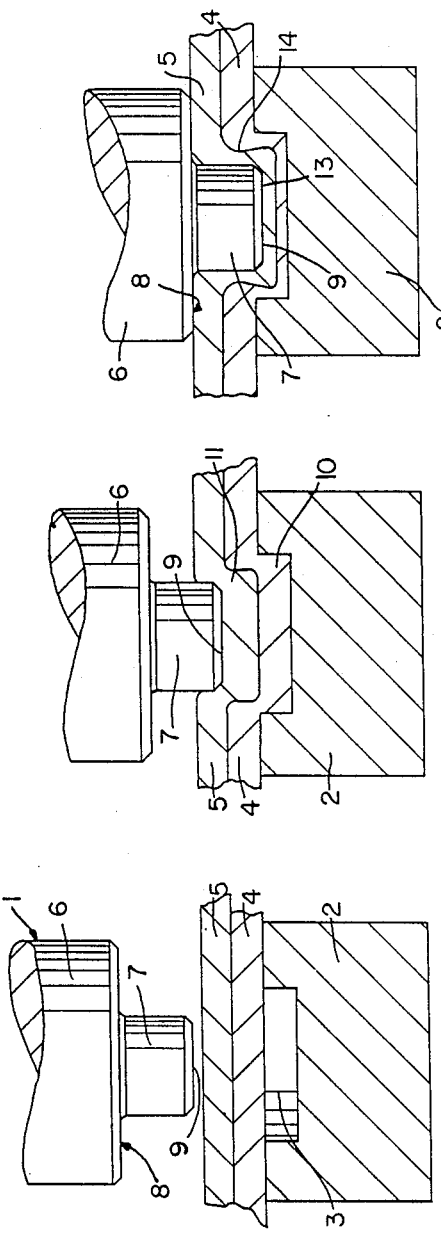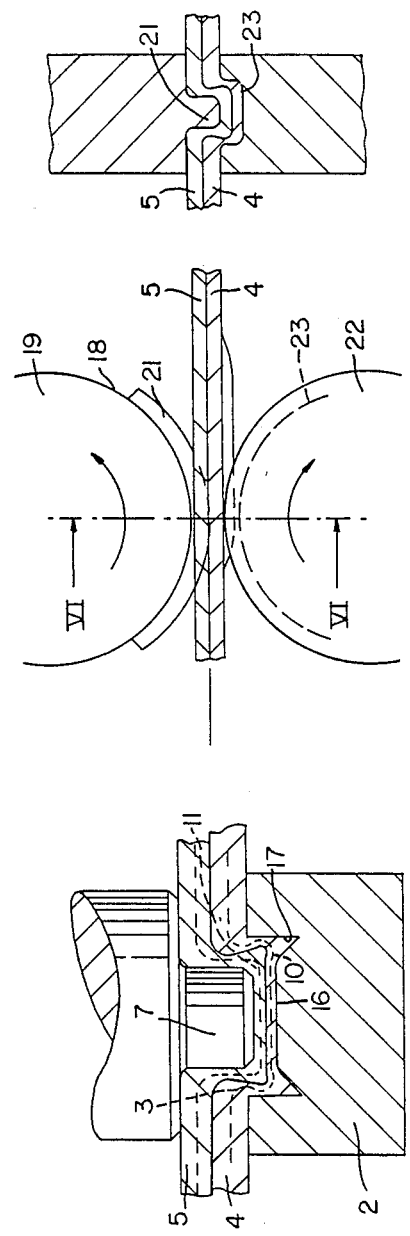

APPARATUS FOR CONNECTING THIN PLATES

This application is a division, of application Ser. No. 906,871, filed 09/15/86 now U.S. Pat. No. 4,760,634.

BACKGROUND OF THE INVENTION

The invention is based on an apparatus for connecting on an apparatus for performing this method as defined hereinafter.

In a known apparatus of this kind (German Offenlegungsschrift No. 31 06 313), the identical generally flat parts stacked on one another are deep drawn over a relatively long path, after which an enlarged stretched area is formed on the side via a lateral extrusion or drawing compression, mechanically chaining the thin plates together somewhat as a rivet would do. To gain sufficient underlying support for a die for the deep drawing, on the one hand, and on the other hand to have enough space available during this same swaging operation for the material that is spread out by being swaged, the bottom die has two outwardly pivotable parts, which are displaced by the material as it flows radially outward during the swaging operation. At the moment in the operation when this pivoting is completed, the deep drawing has already ended, so the bottom die parts are no longer required for deep drawing.

This known technique has the following disadvantages: first, a relatively large "connector button" is created; second, a bottom die tool of this kind, with pivotable parts, can have no more than a relatively short service life given the required high pressure load; third, this apparatus is relatively expensive; fourth, because of the yielding pivoting parts the deep drawing is not of uniform quality, even though these parts are pulled counter to one another when the load is first imposed; and fifth, this bottom die tool, with its moving parts, is extraordinarily vulnerable to dirt, since when chips are produced, which is unavoidable in metal working, the resiliently supported pivoting parts can easily become stuck in the open position, and after that the tool could no longer function properly.

Another apparatus of another known type (German Pat. No. 19 42 411) combines a stamping operation and a deep drawing operation. The diameters of the die opening and of the shaping die for the stamping operation correspond to one another, and interspaces appropriate for the deep drawing operation are provided in the form of recesses; a substantial difference from the generic type initially described above is that the edge of the lower sheet-metal layer is upset radially inward during the compression operation. Aside from the disadvantage that with this technique the connection is no longer liquid-tight or gas-tight, it also requires two separate operations, which are also handled in the press apparatus. Not least, a stamping operation means that a considerable weakening of the material connection takes place.

OBJECT AND SUMMARY OF THE INVENTION

The apparatus according to the invention has the advantage that a solid connection is made in a single operation, that the "connecting cam" of this connection protrudes relatively slightly beyond the surface of the plate, that tool failure due to dirt or wear is impossible, and that the tools can be manufactured extremely inexpensively.

In one embodiment of the invention, there is a continuous crimp in the peripheral area of the bottom of the blind opening. As a result, better flowing of the swaged material into itself at the points that are to be connected is attained, since excess material can be caused to flow out of the way.

According to the invention, metal sheets or bands can be used as the thin plates, and the connection according to the invention also applies to metal sheets with bands. In addition to this connection of metal sheets, connections between nonmetallic plates or of nonmetallic plates and metal plates are also encompassed by the invention.

The invention will be better understood and further objects and advantages thereof will become more apparent from the ensuing detailed description of preferred embodiments taken in conjunction with the drawings.

BRIEF DESCRIPTION OF THE DRAWINGS

FIGS. 1–4 show a first exemplary embodiment in two variants:

FIG. 1 is a longitudinal section taken through a first tool according to the invention, seen prior to the operation but with metal sheets inserted in place;

FIG. 2 shows a tool position after the end of the deep drawing operation;

FIG. 3 shows a tool position after the end of the swaging operation;

FIG. 4 is a longitudinal section taken through the second variant of the tool in a position corresponding to the tool position shown in FIG. 3; and FIGS. 5 and 6 shows a further exemplary embodiment.

DESCRIPTION OF THE PREFERRED EMBODIMENTS

In the drawing, only the actual manufacturing tool is shown. In FIGS. 1–4, the first exemplary embodiment is shown in three working positions. Naturally for the sake of completeness the pressing apparatus is also part of the invention; this may be embodied in the most various ways, and by means of it, in order to make the connection according to the invention, an upper die 1 must be movable back and forth in the direction of a die 2. The die 2 is inserted fixedly into the pressing apparatus (not shown) and has a cylindrical flat blind bore 3 of circular cross section. Onto this die 2, which is thus embodied as a bottom die, a lower plate 4 and an upper plate 5 which are to be joined together therewith are placed. These plates 4 and 5, in this exemplary embodiment, are sheet-metal plates.

The shaping die 1 has a holder shaft 6 and a coaxially disposed working tang 7 of smaller diameter, so that a shoulder 8 is formed.

In FIG. 2, the first part of the operation is shown, that is, the deep drawing is ended, in which the working tang 7 has drawn the flat part of the two plates 4 and 5 that precedes its free end face 9 into the blind bore. At the stretched connections 10 and 11 between the metal sheets, which remain in their original position, and the deep-drawn flat parts, thinning of the material takes place; however, the cup-shaped recess does not yet bring about an interlocking of the metal sheets 4 and 5.

In FIG. 3, the shaping die 1 is shown in its final position, namely after the swaging of the deep-drawn flat parts. In this position, the shoulder 8 rests on the surface of the metal sheet 5. The flat parts facing the end face 9 are highly compressed, and this operation causes the swaged material to effectively flow radially outward. The blind bore 3 is filled up completely, and at the same time a material-strengthening or densification of the deformed material has taken place. Because of the swaging effect, the upper flat part 13 has been radially stretched out to such an extent that it extends behind the deep-drawing opening 14 of the lower metal sheet 4. As a result of the strong forces of deformation, an extremely solid form-fitting connection is also attained because the material is caused to flow radially outward as noted above. To prevent a notching effect, which could possibly cause tearing off of the upper flat part 13 from the plate 5, the face end 9 of the working tang 7 is embodied as basket-shaped. Between the two plates 4 and 5, slightly rounded contact faces are created automatically in any case during the deep drawing operation.

To expel the workpiece, all that needs to be done now is to withdraw the shaping die in an upward direction; after that, the molded deformed area can now be raised slightly out of the blind bore, which has smooth boundary walls in the direction of movement.

In the second exemplary embodiment of a tool shown in FIG. 4, the working position of which corresponds to that shown in FIG. 3, a continuous crimp 17 of wedge-shaped cross section is present in the peripheral area of the bottom 16 of the blind bore 3, into which the material positively displaced by the working tang 7 is also swaged, so that a more pronounced flowing of material can take place as by the flow lines. Since it is possible to cause an increased area of interlocking between the juxtaposed sheets as well as a radial flow of material in each sheet, a firmer connection is effected In the same manner, instead of two metal sheets shown by way of example, a larger number of thin plates stack on top of one another can also be joined together. The approximate resultant course of the surfaces contacting one another in the case of four plates is indicated in FIG. 4 by two broken lines. The important factor is that in the shaping die and in the blind bore of the bottom die, the wall surfaces facing one another extend parallel and in the deep drawing direction, so as to enable easy removal of the interconnected plates from the tool. The cross section of the upper die and the corresponding blind opening may be oval, polygonal or of some other shape. It is also conceivable for the blind opening to be embodied as a groove, in which for the length of the groove, or in individual segments, a connection line or connection points are produced by a suitably embodied shaping die, with the actual swaged connections being created between the side walls of the groove and the shaping die walls facing those walls.

In the second exemplary embodiment shown in FIGS. 5 and 6, this clinched connection is effected via the nip between the two rollers, with the plates 4 and 5 being compressed as they are drawn through the roller pass. On the running face 18 of the upper roller 19, an arcuate projection formed as a strip 21 serves as the shaping die is provided, while on the lower roller 22 there is provided a groove 23 which is complemental to the strip 21 and this serves as the blind opening. The production process, divided into the operations of deep drawing and swaging, is attained here in the form of a gentle transition as the plates 4 and 5 are drawn through the pass between rollers 19 and 22, with the deep drawing operation taking place before the compression passage through the rollers and the swaging operating then being completed in this densely compressed area of the tightest passage. As a result, it is also possible to produce relatively long seams, which may even lend the plates flexural strength, if that is desired.

According to the invention, it is also possible to use only one roller on which the shaping dies are provided and which cooperates with a flat bottom die face, in which the blind openings are disposed. In such an apparatus, the plates 4 and 5 would be at rest, while the roller would roll over the plates.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An apparatus for interlocking superposed sheet-metal plates by passage through die elements comprising a lower die having a nonexpansible blind opening, and upper pressure exerting die element having an extension facing said blind opening with an end face, said extension having a length greater than a depth of said blind opening and a smaller cross section than said blind opening, means for applying pressure to said die element to cause deep drawing of the sheet-metal plates, into said blind opening and lateral swaging of end walls of the drawn portions of the plates and means for controlling movement of said upper die element relative to said blind opening.

2. An apparatus as defined by claim 1, wherein the upper die element has an end face and after the swaging operation, said end face is at least at the height of the entrance of the blind opening.

3. An apparatus as defined by claim 1, wherein the blind opening has crosswise dimensions which are larger by at least twice the thickness of one of said plates than a corresponding crosswise dimension of the end extension of the pressure exerting die element.

4. An apparatus as defined by claim 1, wherein the extension of said upper die element is centrally symmetrical and has a circular cross section.

5. An apparatus as defined by claim 1, wherein the upper die element is a roller and said extension is strip-like in embodiment.

6. An apparatus as defined by claim 1, wherein said blind opening is embodied as a longitudinal groove having parallel sides extending toward said upper die element.

7. An apparatus as defined by claim 5, wherein the upper die element and/or the blind opening is disposed on a running face of at least one roller that rolls on the sheet-metal plates.

8. An apparatus as defined by claim 1, wherein the face end of the upper-die element is slightly basket-shaped in embodiment.

9. An apparatus as defined by claim 1, wherein the upper die element has a step-shaped section in a deep drawing direction with a shaft section of larger dimension and said extension of smaller dimension with a shoulder formed between said extension and said shaft section, whereby said shoulder rests on the plates at the end of a swaging operation.

10. An apparatus as defined by claim 1, wherein the blind opening has a depth which is equivalent to between 50 and 70% of the total thickness of the plates that are to be joined to one another.

11. An apparatus as defined by claim 1, wherein the end extension of the upper die element has a cross-sectional dimension from 60 to 75% and preferably 66 to 70% of the corresponding dimension of the blind opening.

12. An apparatus as defined by claim 1, wherein a recess is provided in the bottom of the blind opening.

13. An apparatus as defined by claim 12, wherein the recess is embodied as a crimped area.

14. An apparatus as defined by claim 13, wherein the crimped area has the cross section of a wedge which widens radially outward.

15. An apparatus as defined by claim 13, wherein the crimped area is continuous around the circumference of the bottom surface.

* * * * *